United States Patent [19]
Force et al.

[11] 3,798,780
[45] Mar. 26, 1974

[54] GAUGES FOR BOWLING BALLS

[76] Inventors: Earl Force, 3000 Judyth SE, Warren, Ohio 44484; Michael Williams, 785 Belvedere NE, Warren, Ohio 44483

[22] Filed: Apr. 26, 1972

[21] Appl. No.: 247,518

[52] U.S. Cl.............................. 33/174 F, 33/174 D
[51] Int. Cl. ......................... G01b 5/00, B43l 13/22
[58] Field of Search ...................... 33/174 D, 174 F

[56] References Cited
UNITED STATES PATENTS

| | | | |
|---|---|---|---|
| 2,088,290 | 7/1937 | Collier.............................. | 33/174 F |
| 3,429,049 | 2/1969 | Snoddy.............................. | 33/174 F |

FOREIGN PATENTS OR APPLICATIONS

| | | | |
|---|---|---|---|
| 637,341 | 2/1962 | Canada............................ | 33/174 F |
| 470,472 | 1/1951 | Canada............................ | 33/174 F |

*Primary Examiner*—John W. Huckert
*Attorney, Agent, or Firm* — Michael Williams

[57] ABSTRACT

Our improved gauges include a gauge for determining the proper hole size in a bowling ball and a gauge for determining the proper span between the holes to be drilled in the bowling ball. The hole size gauge comprises a plurality of compartments of successively increasing sizes, to accommodate fingers of, and determine hole sizes for, bantam, junior and senior bowlers.

The span gauge comprises a device which will fit in the palm of a bowler's hand and includes members which are adjustable to closely fit the span between the thumb and a selected finger of a bowler, whereby the position the hand will occupy on the bowling ball may be visually observed. Once the span gauge is set to the proper span for the bowler, it may be secured to an undrilled bowling ball and the ball marked for hole locations, or the secured span gauge may be used to locate the drill.

10 Claims, 11 Drawing Figures

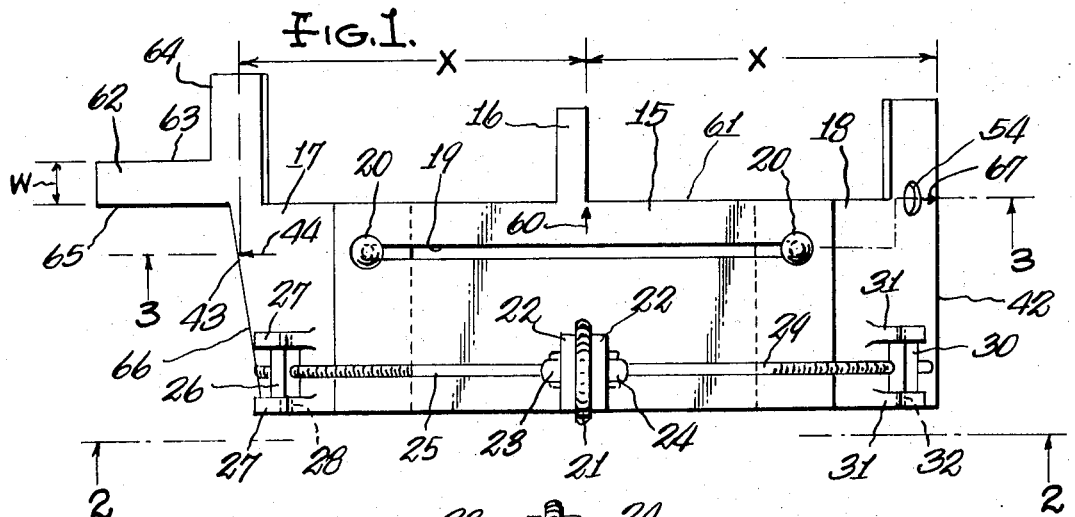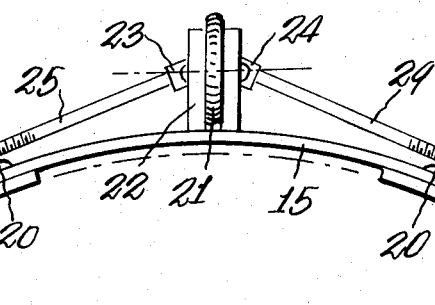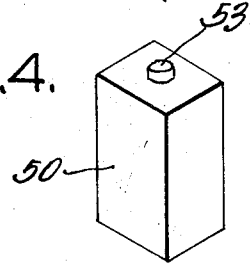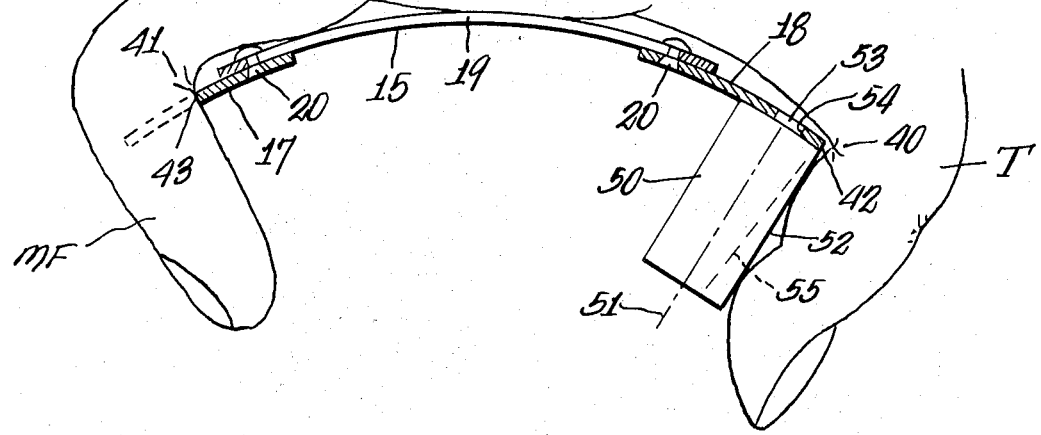

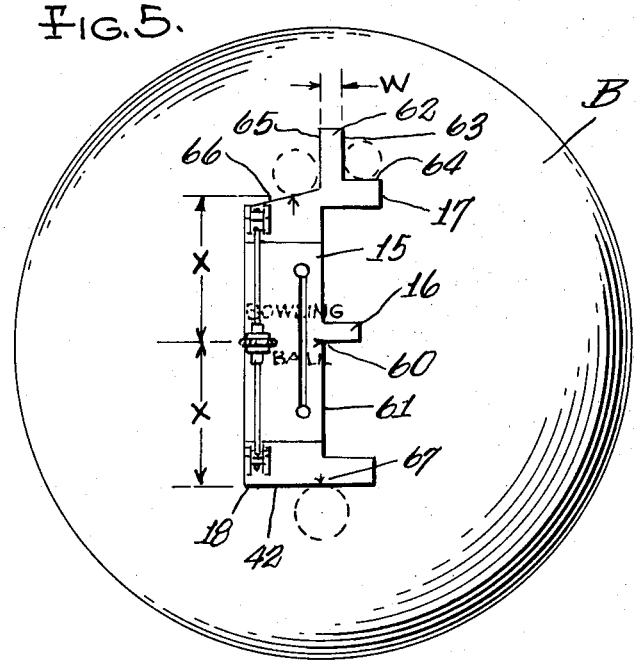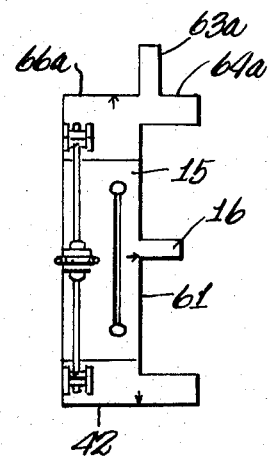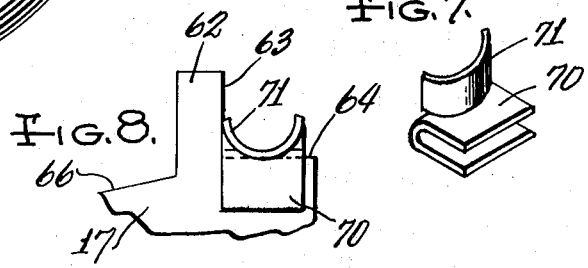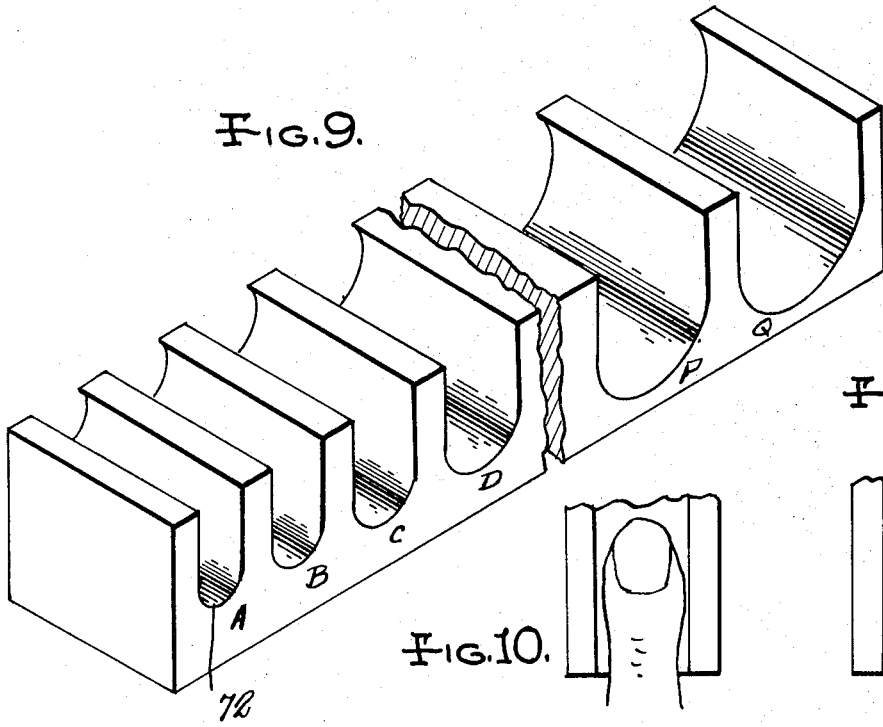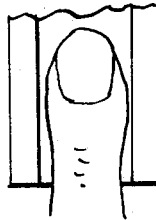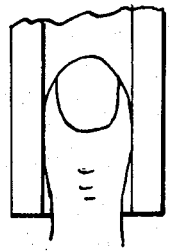

GAUGES FOR BOWLING BALLS

BACKGROUND AND SUMMARY

Determination of bowling hole sizes and proper span location of the holes has been a problem for a long time. Many efforts have been made to solve the problem but insofar as applicants are aware, no practical solution has heretofore been found.

In many cases, a fitting ball has been used to determine both hole sizes and span and this seemed to be a practical solution because the bowler had the feeling that the fitting ball was a close approach to the ball he will ultimately use. However, the fitting ball has many disadvantages. First of all, it is quite expensive and requires an expert to utilize it properly. Secondly, it is not possible to see the disposition of the thumb and fingers in the holes of a fitting ball and quite frequently the fingers were incorrectly inserted which therefore resulted in an incorrect choice of hole size and/or an incorrect choice of span size. Thirdly, even if the holes and span size were correctly chosen, careful measurements had to be made between the thumb and finger holes and this is not only difficult on the curved surface of the fitting ball but also is difficult for those persons not accustomed to making precise measurements. Fourthly, even if the measurements were correctly made and recorded, they had to be translated to a layout gauge which is applied to the bowling ball and used to scribe outlines on the ball for hole locations. Again, the layout gauge required the expertise of a skilled craftsman and even at best was accurate only if all preceeding operations had been carefully and accurately executed.

Our invention eliminates the fitting ball, and thus eliminates its cost and the cost of the layout gauge, and more importantly eliminates the careful measurements and translations thereof. By use of our invention, hole sizes may be accurately determined by visual inspection, and therefore compensations may be made for any deformities of the thumb and fingers.

The span gauge of our invention may be laid in the palm of the hand of a bowler and adjusted to an accurate determination of the span. Since the thumb and fingers are visible during adjustment of the span gauge, their proper disposition presents no problem whatsoever. Once the span gauge is set, it is applied to the ball without any measurement or adjustment needed to accurately locate the holes to be drilled.

Thus, the expensive and troublesome fitting ball is replaced by a low-cost span gauge which may be accurately set by an unskilled operator and, without need of a layout gauge, may be directly applied to the bowling ball to locate the holes.

DESCRIPTION OF THE DRAWINGS

In the drawings accompanying this specification and forming a part of this application, there are shown several embodiments which our invention may assume, and in these drawings:

FIG. 1 is a plan view of our improved span gauge,

FIG. 2 is a side view of the gauge, as viewed along the line 2—2 of FIG. 1, and showing a portion of a bowling ball in dot-dash lines, FIG. 3 is a sectional view corresponding to the line 3—3 of FIG. 1, showing the span gauge applied to the palm of a bowler, FIG. 4 is a perspective view of a part which may be used in FIG. 3, FIG. 5 is a plan view, drawn to a smaller scale, showing the span gauge applied to a bowling ball, FIG. 6 is a plan view of the span gauge shown in FIG. 5, but illustrating a modification, FIG. 7 is a perspective view of a clip which may be applied to the span gauges shown in FIGS. 5 and 6, FIG. 8 is a fragmentary plan view showing the clip of FIG. 7 in one applied position, FIG. 9 is a broken perspective view of a gauge for determining thumb and finger sizes, and FIGS. 10 and 11 illustrate steps in the method of determining hole sizes.

DESCRIPTION OF THE PREFERRED EMBODIMENT

The span gauge of our invention includes a center section 15 which may be rectangular in plan, as seen in FIG. 1, and curved longitudinally as seen in FIG. 2 to correspond to the curvature of the bowling ball B. The center section includes a projection 16 which is of the same thickness and may be integral therewith or formed separately and suitably attached thereto.

Attached to opposite ends of the center section are end sections 17 and 18 which are also curved, as seen in FIG. 2, to correspond to the curvature of the bowling ball. The connection between the center and end sections permits the latter to move longitudinally of the center section and in equal amount. In the presently disclosed embodiment, the center section is formed with a longitudinal slot 19 and each end section has a headed rivet 20 fitting in the slot to not only permit relative movement between the center and end sections but also to hold the sections assembled.

Any suitable means may be provided for movement of the end sections in equal amounts, such as suitable linkage (not shown). However, it is preferred to utilize structure which will not only move the end sections in equal amounts but also retain such sections in any adjusted position. For this purpose the construction best shown in FIGS. 1 and 2 is preferred and includes a thumb wheel 21 which is held between and for rotation by a pair of ears 22—22 which are located at the longitudinal center of the center piece 15 and extend upwardly from an outer surface thereof.

Connected to and extending from opposite sides of the thumb wheel 21 are universal joints 23 and 24 which may be of any commercially available type and therefore need not be shown in detail. The universal joint 23 is connected to, and for rotation with, a threaded rod 25 which has its opposite end threaded in a nut 26 disposed between a pair of ears 27 connected to and extending upwardly from a surface of the end section 17. Trunnions 28 on the nut 26 are journalled in the ears 27 so that the nut may rotate relative to the ears. The universal joint 24 is connected to, and for rotation with, a threaded rod 29 which has its opposite end threaded through a nut 30. The threads on rods 25 and 29 are of opposite hand. The nut 30 is likewise disposed between a pair of ears 31 connected to and extending upwardly from a surface of the end section 18, and trunnions 32 connect the nut to the ears. Thus, depending upon the rotation of the thumb wheel 21, the end sections are moved toward and away from each other in equal amounts. As seen in FIGS. 1 and 5, the dimensions X—X are equal, and these dimensions remain equal to each other in any adjusted position of the end sections. The gauge, as shown in the drawings, represents the condition wherein the dimensions X—X are the largest.

The holes in bowling balls are drilled to various depths, depending on the bowlers preference. Many professional bowlers prefer a finger tip depth whereas many non-professional bowlers prefer the semi-finger tip depth. Regardless of which depth is preferred, the improved gauge of our invention may be accurately set for the correct span. In the finger tip depth, the distance between the crease 40 formed by the joint between the thumb T and palm of the hand (see FIG. 3) and the crease 41 formed by the first joint of the middle finger MF determine the span. Thus, the span gauge is held in the palm, as see in FIG. 3, and the thumb wheel 21 rotated in the proper direction until the end surface 42 of the end section 18 fits within the crease 40 and the surface 43 (at the arrow 44) of the end section 17 fits within the crease 41.

As seen in FIG. 3, the finger tip of the middle finger and the thumb should point generally in a direction at right angles to and away from the gauge. Since some persons have difficulty in properly positioning the thumb, and since proper thumb position is important to a correct span measurement, it is preferred to temporarily connect a block 50 to the under surface of the end section 18, as seen in FIG. 3. The centerline 51 of the block would intersect the center of the bowling ball and therefore the surface 52 of the block, in line with the end surface 42, may be used to properly locate the thumb. The block may be temporarily connected to the end section 18 by inserting a projection 53 tightly within an opening 54 in the end section. If the thumb hole is to be pitched along the pitch line, more accuracy in span measurement may be obtained if the surface 52 of the block 50 is inclined, as seen by the dotted line 55, to correspond to desired pitch and thus provide a proper guide for the thumb. The surface 55 may be formed on the block opposite to or adjoining the surface 52 and may be brought into position by rotating the block in the recess 54.

When the end sections 17 and 18 have been adjusted, the thumb and middle finger are visually inspected to insure that they extend correctly from the span gauge, and the palm of the hand is visually inspected to insure that it adjoins and closely follows the curvature of the gauge. If visual inspection shows the aforementioned are correctly positioned, with the surfaces 42 and 43 fitting within the respective creases of the joints of the thumb and middle finger, the span gauge has been correctly set and may be removed from the hand. The block 50 is disconnected from the end section 18 and the span gauge may be applied to the bowling ball, as seen in FIG. 5.

All bowling balls are provided with some sort of indication to show the exact center point of the top weight of the ball. For perfect balance, the grip holes must be drilled around the exact center point of the top weight of the ball, to offset the weight of the material lost in drilling of the holes. Most bowling balls are provided with lettering which was used to properly align the lay out gauge heretofore used. FIG. 5 shows the term "Bowling Ball" but it will be appreciated that manufacturers use wording of their choice.

As seen in FIG. 5, the arrow 60 on the center section 15 is exactly aligned with the center indication on the ball, and the projection 16 (which is normal to the surface 61 of the center and end sections) is aligned parallel with the lettering. The span gauge is now properly positioned on the bowling ball and may be connected thereto, as by tape or a suitable clamp. As seen in FIGS. 1 and 5, the end section 17 has an extension 62 which is of a width W corresponding to the desired web between the holes for the middle finger and ring finger. The extension provides right angled surfaces 63 and 64 to provide scribe surfaces along which a marking pencil may be drawn to locate the inside corner of the hole for the ring finger. In fitting the gauge to the hand, the extension 62 is disposed between the middle and ring fingers, so that the position of both fingers and the thumb may be visually inspected.

The extension 62 also provides a surface 65 which is substantially aligned with the surface 61 and which forms an angle of slightly greater than 90 degrees with an end surface 66 of the end section 17. In some cases the surface 65 would represent the midpoint of the width W. The surfaces 65 and 66 provide scribe surfaces along which a marking pencil may be drawn to locate the inside corner of the hole for the middle finger. The end surface 42 of the end section 18 provides a scribe surface along which a marking pencil may be drawn to locate the inside surface (in conjunction with an arrow 67) of the hole for the thumb. It will be noted that the surface 64 is offset from the surface 66 in a direction outwardly from the center of the ball, to conform to preference of some bowlers.

When the hole locations have been scribed on the ball, the span gauge may be removed and the holes drilled in any suitable drilling machine. The gauge may be used as a drill locator and in such instance it would not be removed from the ball until all holes have been drilled. To facilitate drill location, a clip 70, such as shown in FIG. 7, may be attached to the span gauge at each part of the latter adjoining the hole to be drilled. FIG. 8 illustrates the clip 70 attached in position to locate the drill for drilling the hole for the ring finger. As seen, a slightly less than semi-circular upstanding portion 71 provides a surface to locate the drill.

Our invention includes a gauge for properly determining hole sizes. Heretofore, in use of the fitting ball, it was not possible to view the thumb or finger and therefore only the person being fitted knew the disposition of his thumb or fingers. It is a known fact that some persons (like office workers) have thumbs and fingers that are flabby, whereas persons who perform heavy physical work have thumbs and fingers that are firm. It is also a known fact that a thumb or finger pressed against a surface will spread in width and that a flabby finger will spread more than a firm one.

Fitting balls now used have space limitations and therefore thumb and finger holes could be provided only in number to accommodate senior and perhaps junior bowlers. However, because of the present great interest in bowling even youngsters (termed bantam bowlers) are now becoming active in this sport, but they have found difficulty in securing a proper fit because of the limitations of the fitting ball.

Our improved gauge shown in FIG. 9 will accommodate all bowlers, including bantam bowlers, junior bowlers and senior bowlers. This gauge may be made of a block of material, (preferably of the type similar to that from which bowling balls are made) and has a series of compartments into which a thumb or finger may be placed. The compartment 72 at the left hand side of the gauge shown in FIG. 9 is of a size to accommodate the smallest finger, and the compartments increase in size progressively. As an example, the compartments may progressively increase from a small size of ½ inch to a large size of 1⅛ inch. The compartments are open at the top to provide free access of the thumb or finger and also to provide a clear view thereof. The bottom of each compartment is rounded to correspond to the curvature of the bowling ball hole of the particular size.

To determine correct hole size, a thumb or finger is placed in a compartment wherein the fit is such that a slight clearance may be seen on either side, as seen in FIG. 10. The thumb or finger is then firmly pressed against the bottom of the selected compartment, and will spread as seen in FIG. 11. If sufficient interference fit is generated between the thumb or finger, when spread, to prevent the latter from being withdrawn from the compartment, the selected compartment represents the correct hole size and this may be recorded for use in drilling. As seen in FIG. 9, each compartment is identified with indicia, such as the lettering shown, and the corresponding drills may be marked with similar indicia. Some bowlers have thumbs or fingers that are deformed by arthritis or accident, and therefore require that the ball hole be elongated to accommodate the deformity, and the improved hole gauge may be utilized to indicate the amount of elongation required. For example, if the thumb or finger is crooked so that it may not be straightened, it may first be inserted within a compartment to determine hole size, as seen in FIGS. 10 and 11, and then be rotated ninety degrees and fitted within another compartment to determine elongation of the hole. If the thumb or finger is crooked laterally, it may first be inserted at right angles to the position seen in FIGS. 10 and 11 to determine hole size, and then rotated ninety degrees and fitted within another compartment to determine hole elongation.

DESCRIPTION OF OTHER EMBODIMENT

The span gauge shown in FIGS. 1 through 5 is designed for use of right-handed bowlers, and a mirror image of the same would be required for left-handed bowlers. The embodiment shown in FIG. 6 may be used for either left or right-handed bowlers. In this embodiment, most of the structure is the same as previously described. The only change is to bring the surface 66a in line with the surface 64a. In this case, and for right-handed bowlers, lines would be scribed for the middle finger, as before, and the gauge then moved so that the surface 66a is offset toward the center of the ball the required amount.

For left-handed bowlers, the surface 64a would be inserted in the joint of the middle finger to determine correct span size and the surfaces 64a and 63a used to scribe the boundary of the hole for the middle finger. Then the gauge would be moved so that the surface 66a is offset away from the center of the ball the required amount.

We claim:

1. A gauge for determining the span of a bowler's hand, comprising:
    a center member and two end members respectively connected to opposite ends of said center member and adjustable longitudinally thereof, said center and connected end members being adapted to fit within the palm of the hand of a bowler,
    one end member having a portion adapted to fit within the crease formed by the joint between the thumb and palm and the other end member having a portion adapted to fit within a crease formed by a selected joint of the middle finger,
    each member being thin and longitudinally curved to correspond to the curvature of a bowling ball,
    and means for adjusting said end members toward and away from said center member in equal amounts.

2. The construction according to claim 1 wherein said center member has a longitudinal slot and each of said end members has a rivet sliding in said slot and holding said members assembled, said adjusting means including a thumb wheel rotatably carried by said center member and having oppositely threaded rods extending axially from its opposite sides, said rods being threaded into nuts respectively carried by said end members.

3. The method of determining the span of a bowler's hand and translating it to a bowling ball, comprising:
    laying a gauge in the palm of the hand, the gauge including three thin members which are longitudinally curved to correspond to the curvature of a bowling ball, two end members being connected to a center member and simultaneously adjustable in equal amounts toward and away from the center of said center member;
    adjusting the end members so that an end surface of one fits within the crease between the thumb and the palm of the hand and an end surface of the other fits within a selected crease of the middle finger of the hand;
    removing the gauge from the hand and applying it to the surface of the bowling ball so that said members follow the curvature of the bowling ball;
    seting the center of the center member at the center indication of the bowling ball;
    and scribing lines along said end surface of respective end members.

4. The method of claim 3 and including the step of connecting a block to one of said end members to position the thumb along the pitch line during determination of span size.

5. A gauge for determining the span of a bowler's hand, comprising:
    a plurality of members connected together for relative movement and adapted to fit within the palm of the hand of a bowler, one of said members having a portion adapted to fit within the crease formed by a selected joint of the thumb, and said members being adjustable so that a portion of another member fits within a crease formed by a selected joint of the middle finger,
    each of said members being thin and having corresponding side surfaces longitudinally curved to correspond to the curvature of a bowling ball,
    said side surfaces being free of lateral extensions therefrom so that said side surfaces may be applied directly to the bowling ball surface and hole locations scribed from said portions of respective members.

6. The construction according to claim 5 and further including an abutment member detachably connected to the portion of said one member to extend from its side surface and provide a location for the thumb of the bowler's hand during span-determining operation, said abutment member being removable from said one member after the span has been determined so that said side surfaces may be applied directly to the bowling ball surface.

7. The construction according to claim 5 wherein the portion of said other member has an end extension adapted to fit between the middle and ring fingers of the bowler's hand, a part on one side of said extension being adapted to fit within a crease formed by a selected joint of the middle finger, and a part on the other side of said extension being adapted to fit within a crease formed by a selected joint of the ring finger.

8. A gauge for determining the span of a bowler's hand, comprising:

a center member and two end members respectively connected to opposite ends of said center member and adjustable longitudinally of the latter, said center and connected end members being formed of thin rigid material longitudinally curved to correspond to the curvature of a bowling ball, and adapted to fit within the palm of the hand of a bowler, said center member having a side edge projection providing a location for aligning said projection with a center indication on the bowling ball, one of said end members having a portion adapted to fit within the crease formed by a selected joint of the thumb of the bowler's hand and providing a location for scribing the position of the thumb hole to be drilled in the ball, the other of said end members having an end extension adapted to fit between the middle and ring fingers of the bowler's hand, a part on one side of said extension being adapted to fit within a crease formed by a selected joint of the middle finger, and a part on the other side of said extension being adapted to fit within a crease formed by a selected joint of the ring finger, each of said parts providing a location for scribing the position of the middle and ring finger holes, respectively, to be drilled in the ball.

9. The construction according to claim 8, including means for adjusting said end members toward and away from said center member in equal amounts.

10. The construction according to claim 9 wherein said center member has a longitudinal slot and each of said end members has a rivet sliding in said slot and holding said center and end members assembled, said adjusting means including a thumb wheel rotatably carried by said center member and having oppositely threaded rods extending axially from its opposite sides, said rods being threaded into nuts respectively carried by said end members.

* * * * *